No. 668,854.
S. J. KNIGHT.
FISH TRAP.
(Application filed Nov. 23, 1900.)
(No Model.)
Patented Feb. 26, 1901.
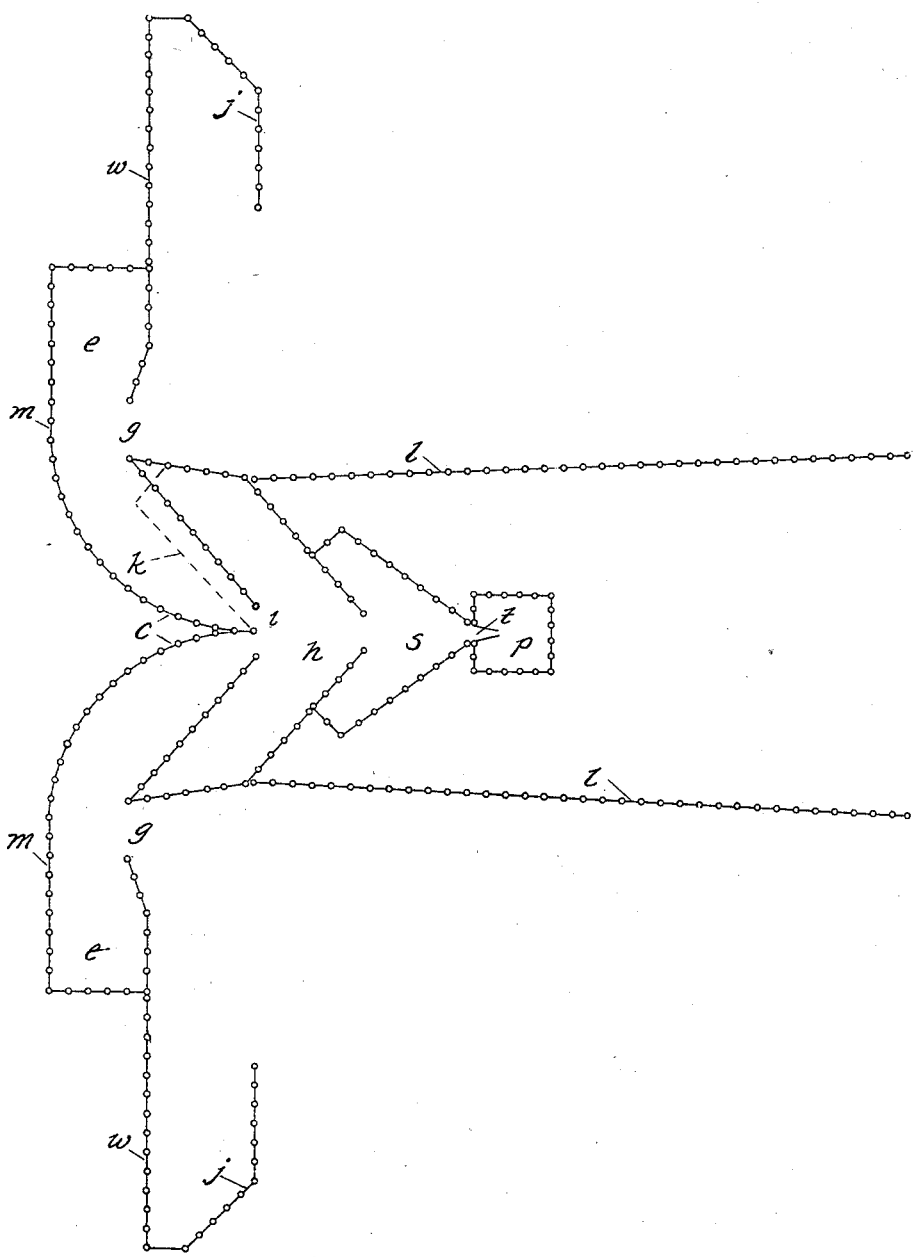
WITNESSES:
F. D. Moss.
E. Wright
INVENTOR
Samuel J. Knight
BY
Pierr. Barries.
ATTORNEYS

UNITED STATES PATENT OFFICE.

SAMUEL J. KNIGHT, OF FAIRHAVEN, WASHINGTON.

FISH-TRAP.

SPECIFICATION forming part of Letters Patent No. 668,854, dated February 26, 1901.

Application filed November 23, 1900. Serial No. 37,505. (No model.)

*To all whom it may concern:*

Be it known that I, SAMUEL J. KNIGHT, a citizen of the United States, residing at Fairhaven, in the county of Whatcom and State of Washington, have invented certain new and useful Improvements in Fish-Traps, of which the following is a specification, reference being had therein to the accompanying drawing.

This invention relates to improvements in fish-traps, and its object is to provide a trap more compact and at the same time having a greater length of leads, walls, or fences for guiding the fish to the pot than have other traps now in use. These advantages I accomplish by the use of wings or "jiggers" and other fences or walls arranged to turn the fish back or shoreward into and through the hearts to the pot, which is positioned between the outer end of the trap-leads and the shore instead of extending the system of leads, hearts, and pot in a continuous line as was thought necessary until I demonstrated that with suitable wall arrangement the fish may be turned shoreward. By concentrating the trap in shallower water the walls can be made stronger with the use of a less number of piles, and, as in my improved trap, where the pot and hearts are inclosed between the leads they are thereby protected from floating substances, such as driftwood, seaweed, or kelp.

The accompanying drawing is a plan view of my improved fish-trap, showing lines of fences or walls forming guideways and compartments which are constructed by first driving piles at about ten feet centers along the various lines and connecting them together to complete the walls by mesh or woven wire screens except as to the pot-walls where a net is used that may be withdrawn to remove the fish therefrom.

In the drawing, 1 represents the leads extending from the shore, or as close to the shore as the navigation laws permit, at right angles preferably, and adapted, in conjunction with the wings or jiggers $w$, having looped extremities $j$, to guide the fish through openings $g$ to inclosures $e$, which have their outer walls $m$ curved, as at $c$, to form aprons to turn the fish in a reverse or inshore direction to the heart $h$. From thence the fish pass through another heart $s$ and the tunnel $t$, ultimately being entrapped in the pot $p$.

In certain localities where the fish in schools travel along the shore in but one direction, then instead of making the outer works (the leads $e$, wings $w$, and inclosures $e$) in duplicate, as shown in the drawing, those on one side may be omitted without departing from my invention or sacrificing its advantages. On the side not being utilized the opening, as at $i$, is closed, preferably by running a wall, as indicated by broken lines $k$, back at some distance from the mouth of said opening to form a pocket, as shown.

Having thus described my invention, what I claim as new, and desire to secure by Letters Patent, is—

1. A fish-trap having leads extending in about right angles from the shore-line, wings to guide the fish from leads to inclosures, said inclosures with walls arranged to turn the fish in a reverse direction and guide them to the hearts and a pot positioned between the said leads.

2. A fish-trap, comprising a lead or leads with a wing or wings extending in lines approximately at right angles thereto formed with looped end or ends, inclosure or inclosures having wall or walls formed to turn the fish in a reverse direction to heart or hearts and leading the fish into the pot, substantially as set forth.

3. A fish-trap comprising a pot $p$, a heart $s$ adjacent thereto, another heart $h$ adjacent to the heart $s$, the inclosure or inclosures $e$ adjacent to the heart $h$ and having rear wall or walls $m$ thereof curved to guide the fish to heart $h$, the wing or wings $w$ having loops $j$ thereon and the lead or leads $l$, all substantially as herein shown and described.

4. In a fish-trap, in combination with leads, wings and hearts and a pot positioned between said leads, of means to turn the fish from the said leads and wings to the said hearts and pots in the manner substantially as set forth.

5. In a fish-trap, in combination with a pot and hearts, of leads and fish-guideways surrounding the same on three sides, substantially as set forth.

6. In a fish-trap, in combination with the leads $l$ and a pot $p$ and hearts $h$, $s$ positioned between the said leads, of wings $w$ and inclosures $e$ substantially as shown and described.

7. In a fish-trap, in combination with inclosures $e$, leads $l$ and a pot $p$ and hearts $h$, $s$ positioned between the said leads, of wings $w$ having looped ends $j$ substantially as shown and described.

In testimony whereof I affix my signature in presence of two witnesses.

SAMUEL J. KNIGHT.

Witnesses:
LINDA ALVERSON,
ROLAND G. GAMWELL.